(12) United States Patent
Zhang et al.

(10) Patent No.: US 11,153,562 B2
(45) Date of Patent: Oct. 19, 2021

(54) METHOD AND APPARATUS OF ADVANCED DEBLOCKING FILTER IN VIDEO CODING

(71) Applicants: Kai Zhang, Beijing (CN); Jicheng An, Beijing (CN); Han Huang, Beijing (CN)

(72) Inventors: Kai Zhang, Beijing (CN); Jicheng An, Beijing (CN); Han Huang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 541 days.

(21) Appl. No.: 15/758,874

(22) PCT Filed: Sep. 13, 2016

(86) PCT No.: PCT/CN2016/098834
§ 371 (c)(1),
(2) Date: Mar. 9, 2018

(87) PCT Pub. No.: WO2017/045580
PCT Pub. Date: Mar. 23, 2017

(65) Prior Publication Data
US 2020/0236353 A1   Jul. 23, 2020

(30) Foreign Application Priority Data
Sep. 14, 2015  (WO) ................ PCT/CN2015/089523

(51) Int. Cl.
*H04N 19/86* (2014.01)
*H04N 19/117* (2014.01)
(Continued)

(52) U.S. Cl.
CPC ......... *H04N 19/117* (2014.11); *H04N 19/136* (2014.11); *H04N 19/176* (2014.11); *H04N 19/86* (2014.11)

(58) Field of Classification Search
CPC ...... H04N 19/117; H04N 19/14; H04N 19/86; H04N 19/174
See application file for complete search history.

(56) References Cited

U.S. PATENT DOCUMENTS 8,098,331 B2   1/2012 Miyazawa
9,083,978 B2 *  7/2015 Narroschke ............ H04N 19/86
(Continued)

FOREIGN PATENT DOCUMENTS

CN   101098395 A   1/2008
CN   101409833 A   4/2009
(Continued)

OTHER PUBLICATIONS

Reducing pixel line buffer, modifying deblock-filter for horizontal LCU boundaries; Hsu; 2012; (Year: 2012).*
(Continued)

*Primary Examiner* — Luis Perez-Fuentes
(74) *Attorney, Agent, or Firm* — McClure, Qualey & Rodack, LLP (57) ABSTRACT

A method and apparatus for adaptive de-blocking filter are disclosed. One or more parameters associated with a de-blocking filter are determined. De-blocking filter using the derived parameters are then applied to reconstructed blocks. Each set of parameters is used for each picture, slice, coding tree unit (CTU) or CU (coding unit). The parameters can be signalled in VPS (video parameter set), SPS (sequence parameter set), PPS (picture parameter set), slice header, CTU (coding tree unit) or CU (coding unit) of the video bitstream. The parameters correspond to one or more values used as thresholds, clipping boundaries, or both the thresholds and clipping boundaries for the de-blocking filter. In one embodiment, the parameters for the current picture are
(Continued)

determined using a training process using a current coded picture a previous coded picture as training data.

20 Claims, 8 Drawing Sheets

(51) Int. Cl.
*H04N 19/136* (2014.01)
*H04N 19/176* (2014.01)

(56) References Cited

U.S. PATENT DOCUMENTS

| | | | |
|---|---|---|---|
| 9,161,046 B2 * | 10/2015 | Van der Auwera | H04N 19/176 |
| 9,167,269 B2 * | 10/2015 | Van der Auwera | H04N 19/82 |
| 9,344,716 B2 * | 5/2016 | Seregin | H04N 19/14 |
| 9,445,126 B2 * | 9/2016 | Chien | H04N 19/117 |
| 9,451,258 B2 | 9/2016 | Van Der Auwera et al. | |
| 9,667,996 B2 * | 5/2017 | Chen | H04N 19/52 |
| 9,723,331 B2 * | 8/2017 | Van der Auwera | H04N 19/13 |
| 10,142,642 B2 * | 11/2018 | Zhang | H04N 19/52 |
| 10,616,577 B2 * | 4/2020 | Zhang | H04N 19/86 |
| 2008/0002061 A1 | 1/2008 | Miyazawa | |
| 2013/0094572 A1 * | 4/2013 | Van der Auwera | H04N 19/126 375/240.03 |
| 2013/0101031 A1 * | 4/2013 | Van der Auwera | H04N 19/14 375/240.12 |
| 2013/0188744 A1 * | 7/2013 | Van der Auwera | H04N 19/117 375/240.29 |
| 2014/0233659 A1 * | 8/2014 | Narroschke | H04N 19/174 375/240.29 |
| 2014/0341271 A1 | 11/2014 | Mody et al. | |
| 2015/0016518 A1 * | 1/2015 | Li | H04N 19/156 375/240.12 |
| 2016/0241882 A1 | 8/2016 | Sato | |

FOREIGN PATENT DOCUMENTS

| | | |
|---|---|---|
| CN | 101854548 A | 10/2010 |
| CN | 102655593 A | 9/2012 |
| CN | 102792692 A | 11/2012 |
| CN | 103269432 A | 8/2013 |
| CN | 103957425 A | 7/2014 |
| JP | 2013-540395 A | 10/2013 |
| JP | 2015512600 A | 4/2015 |
| WO | 2015/052979 A1 | 4/2015 |
| WO | 2015053001 A1 | 4/2015 |

OTHER PUBLICATIONS

_HEVC deblocking filter; Norkin; 2012. (Year: 2012).*
_Reducing pixel line buffer, modifying deblock-filter for horizontal LCU boundaries; 2012. (Year: 2012).*
Norkin, A., et al.; "HEVC Deblocking Filter;" IEEE Transactions on Circuits and Systems for Video Technology; vol. 22; No. 12; Dec. 2012; pp. 1746-1754.
Hsu, C.W., et al.; CE10.2.1: Reducing one pixel line buffer by modified deblocking filter for horizontal LCU boundaries; Joint Collaborative Team on Video Coding (JCT-VC) of ITU-T SG16 WP3 and ISO/IEC JTC1/SC29/WG11; Feb. 2012; pp. 1-8.
International Search Report dated Dec. 7, 2016, issued in application No. PCT/CN2016/098834.
H.265 HEVC Textbook, published on Oct. 21, 2013, pp. 1-37.
1 HEVC (MPEG-H/ITU-T H.265), Published on Jul. 1, 2013, pp. 1-9.
ITU-T H.265 Published on Apr. 2015, p. 1-45.
"Intra frame coding of adaptive loop filter coefficients;" Telelcommunication Standardization Sector; Jan. 2009; pp. 1-4.
Chen, J., et al.; "Description of scalable video coding technology proposal by Qualocomm," Joint Collaborative Team on Video Coding (JCT-VC) of ITU-T SG 16 WP 3 and ISO/IEC JTC1/SC29/WG11; Oct. 2012; pp. 1-22.

* cited by examiner

METHOD AND APPARATUS OF ADVANCED DEBLOCKING FILTER IN VIDEO CODING

CROSS REFERENCE TO RELATED APPLICATIONS

The present invention claims priority to PCT Patent Application, Serial No. PCT/CN2015/089523, filed on Sep. 14, 2015. The PCT Patent Application is hereby incorporated by reference in its entirety.

TECHNICAL FIELD

The present invention relates to coding of video and image data. In particular, the present invention relates to techniques to improve video quality by using de-blocking (deblocking) filtering on the reconstructed.

BACKGROUND

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU).

Figure 1A:
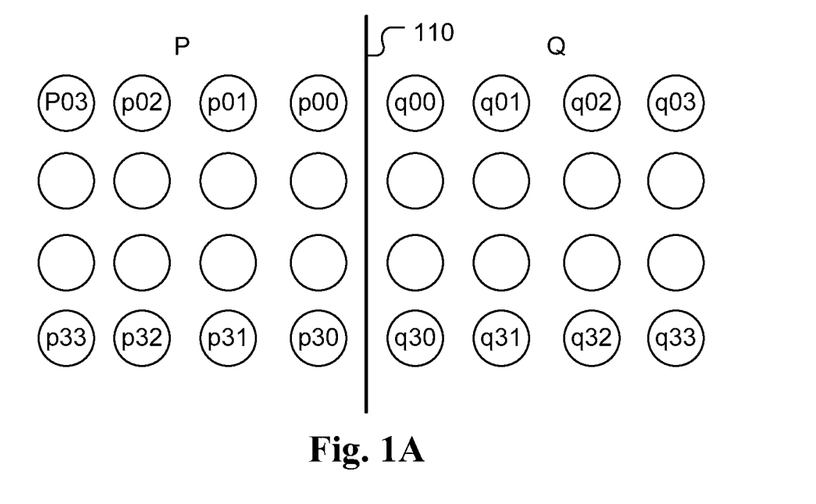
FIG. 1A illustrates an example of vertical boundary and involved samples of two blocks (P and Q) on two sides of the vertical boundary for de-blocking filtering.
Figure 1B:
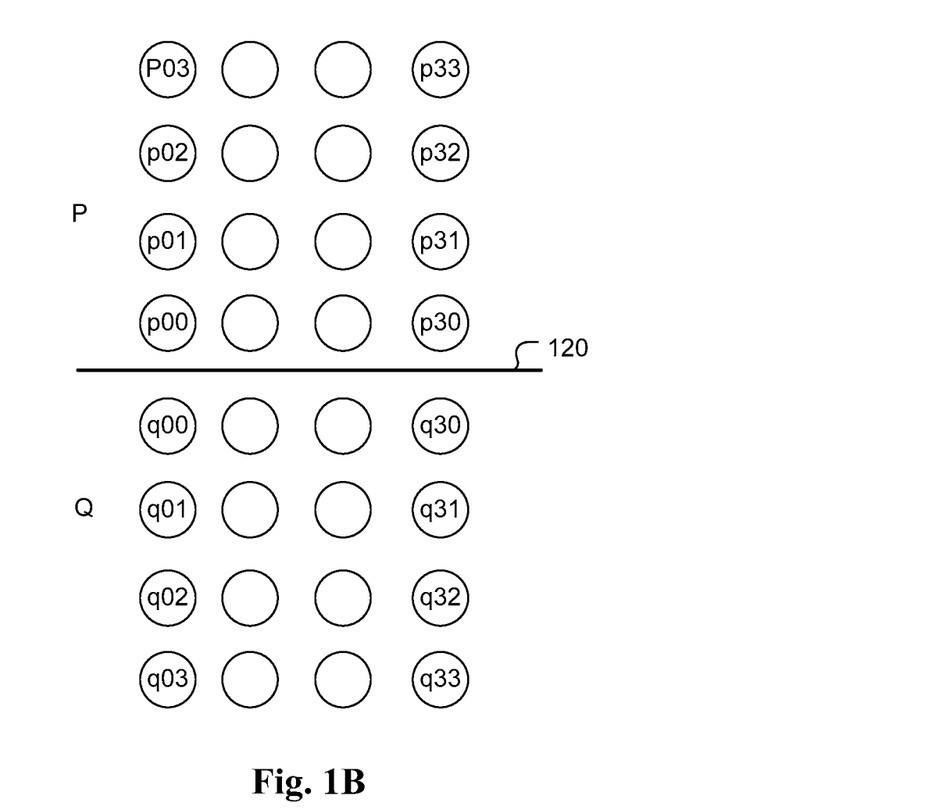
FIG. 1B illustrates an example of horizontal boundary and involved samples of two blocks (P and Q) on two sides of the horizontal boundary for de-blocking filtering.

In video coding standard H.265/HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filter for the vertical boundary (110) and horizontal boundary (120) as shown in FIG. 1A and FIG. 1B respectively.

In HEVC, luma pixels and chroma pixels are processed in different ways in the de-blocking process. A boundary strength (BS) value is calculated for each boundary according to the coding modes of the two adjacent blocks P and Q as shown in Table 1:

TABLE 1

| Conditions | Bs |
|---|---|
| At least one of the blocks is Intra | 2 |
| At least one of the blocks has non-zero coded residual coefficient and boundary is a transform boundary | 1 |
| Absolute differences between corresponding spatial motion vector components of the two blocks are >=1 in units of inter pixels | 1 |

TABLE 1-continued

| Conditions | Bs |
|---|---|
| Motion-compensated prediction for the two blocks refers to different reference pictures or the number of motion vectors is different for the two blocks | 1 |
| Otherwise | 0 |

For luma pixels, de-blocking is performed on each 4 lines when BS is larger than 0. For each 4 lines, several variants are calculated as follows, where pij and qij, and $0 \leq i,j \leq 3$ are shown in FIG. 1A and FIG. 1B:

$dp0 = |2*p01 - p02 - p00|$ $dq0 = |2*q01 - q02 - q00|$ $dp3 = |2*p31 - p32 - p30|$ $dq3 = |2*q31 - q32 - q30|$ $dp = dp0 + dp3$  (1)

$dq = dq0 + dq3$  (2)

$d0 = dp + dq$.

Figure 2:
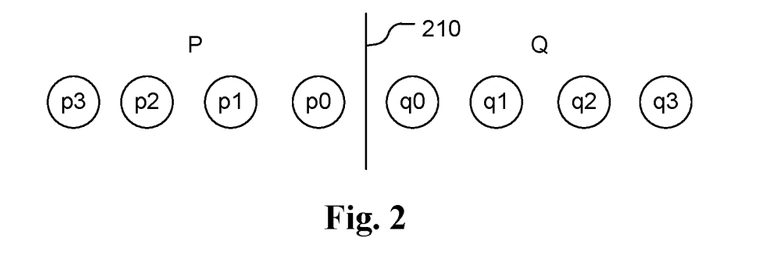
FIG. 2 illustrates an example of vertical boundary and involved samples of one line on two sides of the vertical boundary for de-blocking filtering.
Figure 3:
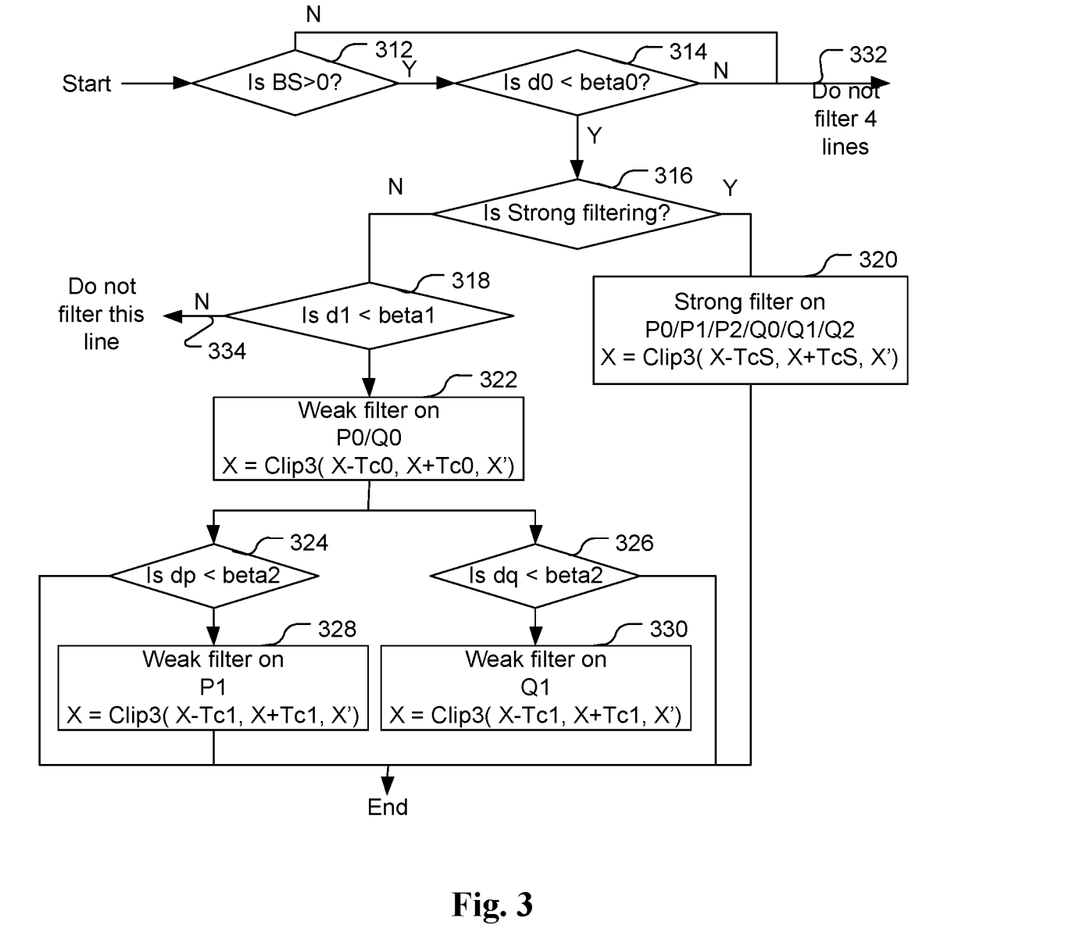
FIG. 3 illustrates an exemplary flowchart of de-blocking filtering a single line for the luma component.

FIG. 3 illustrates an exemplary flow chart for filtering each line of the 4 lines shown in FIG. 2 according to HEVC. In FIG. 2, the 4 pixels on one side of the boundary 210 are labelled as p0, p1, p2 and p3 from the pixel closest to the boundary to the pixel farthest from the boundary. The 4 pixels on the other side of the boundary 210 are labelled as q0, q1, q2 and q3 from the pixel closest to the boundary to the pixel farthest from the boundary. In FIG. 3, various tests (312, 314, 316, 318, 324 and 326) based on boundary strength and the boundary pixel characteristics as derived above are performed to determine whether strong filtering (320), weak filtering (322, 328 and 330) or no filtering for 4 lines (332) or no filtering for 1 line (334). In FIG. 3, beta0, beta1 and beta2 are threshold values, which are determined from B_Table or T_Table signalled in the video bitstream. In FIG. 3, TcS, Tc0, Tc1 correspond to clipping boundary values, or clipping boundaries, which are determined from T_Table signalled in the video bitstream.

For strong de-blocking filtering, the de-blocking filter is performed as follows, where $p_0'$, $p_1'$, $p_2'$, $q_0'$, $q_1'$ and $q_2'$ are filtered pixels:

$p_0' = (p_2 + 2*p_1 + 2*p_0 + 2*q_0 + q_1 + 4) >> 3$ $p_1' = (p_2 + p_1 + p_0 + q_0 + 2) >> 2$ $p_2' = (2*p_3 + 3*p_2 + p_1 + p_0 + q_0 + 4) >> 3$ $q_0' = (p_1 + 2*p_0 + 2*q_0 + 2*q_1 + q_2 + 4) >> 3$ $q_1' = (p_0 + q_0 + q_1 + q_2 + 2) >> 2$ $q_2' = (p_0 + q_0 + q_1 + 3*q_2 + 2*q_3 + 4) >> 3$.

For weak de-blocking filtering, the de-blocking filter is performed as follows, where $p_0'$, $p_1'$, $p_2'$, $q_1'$ and $q_2$ are filtered pixels:

$p_0' = p_0 + \Delta$ $q_0' = q_0 - \Delta$ $p_1' = p_1 + \Delta p$ $q_1' = q_1 + \Delta q$, where $$\Delta=(9*(q_0-p_0)-3*(q_1-p_1)+8)>>4 \quad (3)$$

$$\Delta p=(((p_2+p_0+1)>>1)-p_1+\Delta)>>1$$

$$\Delta q=(((q_2+q_0+1)>>1)-q_1-\Delta)>>1.$$

The absolute value of $\Delta$ in eq. (3) is referred as d1 (i.e., d1=|$\Delta$|). For convenience, d1 is referred as the first boundary activity measure. The dp and dq mentioned above are referred as the second boundary activity measure and the third boundary activity measure respectively in this disclosure.

Figure 4:
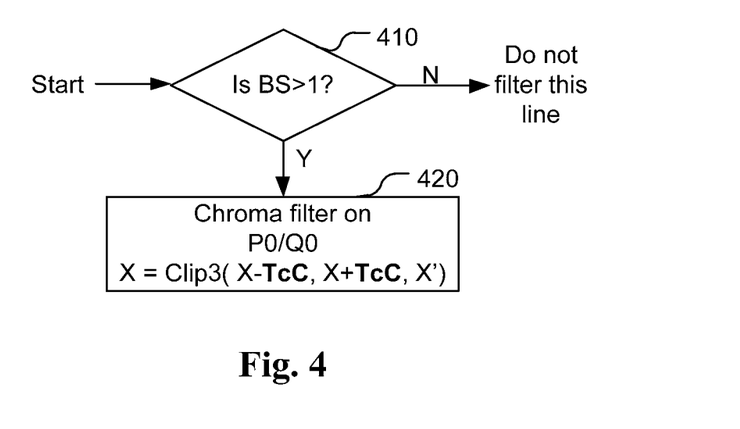
FIG. 4 illustrates an exemplary flowchart of de-blocking filtering a single line for the chroma component.

For filtering a single line for the chroma component in the 4 lines as depicted in FIG. 2, the filtering flow chart is shown in FIG. 4. The flow chart is much simpler than the luminance component. Whether the boundary strength (BS) is larger than 1 is checked in step 410. If the result is "Y" (i.e., Yes), the de-blocking filtering is performed in step 420. Otherwise, (i.e., the "N" path) no filtering is applied to this line. In FIG. 4, TcC is a clipping boundary, which is determined from T_Table signalled in the video bitstream.

For de-blocking filtering of the chroma component, the de-blocking filter is performed as follows, where $p_o'$ and $q_0'$ are filtered pixels:

$$p_0'=\text{Clip1}_C(p_0+\Delta c)$$

$$q_0'=\text{Clip1}_C(q_0-\Delta c), \text{ where}$$

$$\Delta c=((((q_0-p_0)<<2)+p_1-q_1+4)>>3).$$

The thresholds and clipping boundaries are set as follows:

$$QP=(QP\_P+QP\_Q)/2$$

$$B=B\text{ Table}[QP], T=T\_\text{Table}[QP][BS]$$

$$\text{Beta0}=B, \text{Beta1}=10*T, \text{Beta2}=3*B/16 \quad (4)$$

$$TcS=2*T, Tc0=T, Tc1=T/2, TcC=T. \quad (5)$$

In the above thresholds and clipping boundaries, B_Table and T_Table are two fixed tables predefined in the standard, and should be maintained in both encoders and decoders. The B_Table corresponds to the threshold values and is signalled in the video bitstream for various QP (quantization parameters). The T_Table corresponds to the clipping boundaries and is signalled in the video bitstream for various QP and BS values. The thresholds and clipping boundaries are used in determining the parameters for filter decisions.

The current de-blocking filtering method cannot always achieve the best subjective and objective performance for different kinds of sequences. Accordingly, it is desirable to develop techniques that can adapt the de-blocking filter to the underlying picture or a part of the picture for improved performance.

SUMMARY

A method and apparatus for adaptive de-blocking filter are disclosed.

Accordingly to the present invention, one or more parameters associated with a de-blocking filter are determined. De-blocking filter using the derived parameters are then applied to reconstructed blocks. Each set of parameters is used for each picture, slice, coding tree unit (CTU) or CU (coding unit). The parameters can be signalled in VPS (video parameter set), SPS (sequence parameter set), PPS (picture parameter set), slice header, CTU (coding tree unit) or CU (coding unit) of the video bitstream. The parameters correspond to one or more values used as thresholds, clipping boundaries, or both the thresholds and clipping boundaries for the de-blocking filter. For example, the thresholds may correspond to Beta0, Beta1 and Beta2, and the clipping boundaries may correspond to TcS, Tc0, Tc1, and TcC.

Different parameters can be used for different boundary directions (i.e., vertical vs horizontal), different boundary strengths or different quantization parameters. For clipping boundary TcC, different TcC can be used for the U component and the V component.

A flag can be signalled in the video bitstream to indicate whether the parameters are signalled in the video bitstream. For example, the flag can be signalled to indicate whether the parameters are signalled in the video bitstream for a particular boundary strength, a particular boundary direction (i.e., vertical or horizontal), or a particular colour component (e.g. luma component or chroma component).

In order to improve the coding efficiency, the parameters can be coded using prediction. For example, the parameters for a first boundary direction (e.g. vertical or horizontal) are predicted the parameters for a second boundary direction (e.g. horizontal or vertical). In another example, the parameters for a first boundary strength are predicted by the parameters for a second boundary strength, where the first boundary strength can be larger than or smaller than the second boundary strength. The parameters may also be predicted by a set of predefined parameters. The parameters for a current picture may be predicted by said one or more parameters for a previous picture. In another embodiment, one threshold value can be predicted by another threshold value, or one clipping boundary value is predicted by another clipping boundary value.

In order to reduce the complexity associated with de-blocking filtering, the decision step "d1<Beta1" can be skipped, where d1 is related to first discontinuity boundary activity measure of neighbouring samples across a selected boundary. Furthermore, additional decision steps "dp<Beta2" and "dq<Beta2" can also be skipped, where dp and dq are related to second boundary activity measure and third boundary activity measure of neighbouring samples across the selected boundary.

Another aspect of the present invention discloses a method of deriving the parameters using a training process. In particular, one or more tables are used to tabulate target values associated with the de-blocking filter by using a current coded picture or a previous coded picture as training data. For the thresholds, the tables tabulate distortion for various candidate thresholds, and the thresholds are determined from the candidate thresholds that achieve a smallest distortion value. For the clipping boundaries, the tables tabulate distortion for various candidate clipping boundaries, and the clipping boundaries are determined from the candidate clipping boundaries that achieve a smallest distortion value.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In the following description, Y component is identical to luma component, U component is identical to Cb component and V component is identical to Cr component. A chroma component can be the U component or the V component.

In order to further improve the performance of the de-blocking filtering, advanced methods are disclosed in the present invention. In the conventional de-blocking filtering process, the parameters are always fixed for all sequences regardless of the local characteristics of the underlying image data. According to the present invention, the parameters are adapted locally to the underlying image data. For example, the de-blocking filter can be specifically determined for each picture, slice, coding tree unit (CTU) or CU. The parameters may correspond to the values of threshold (e.g. Beta0, Beta1 and Beta2), clipping boundaries (e.g. TcS, Tc0, Tc1, and TcC) or both.

Figure 5:
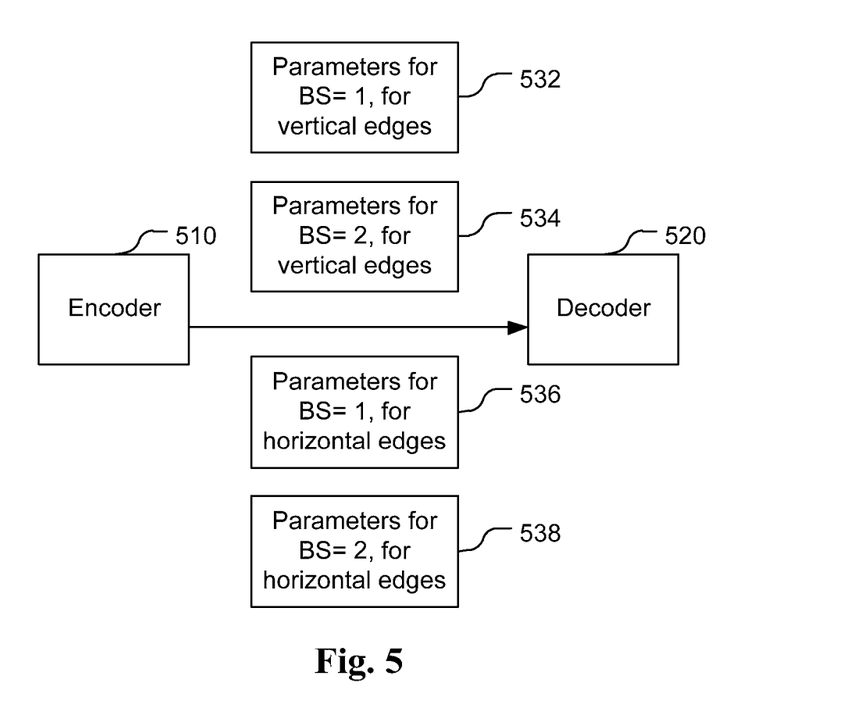
FIG. 5 illustrates an example of information related to de-blocking filter transmitted from an encoder to a decoder.

In one embodiment, the parameters used in de-blocking filtering (e.g. the values of thresholds and clipping boundaries, such as Beta0, Beta1 and Beta2, and TcS, Tc0, Tc1, and TcC) are signalled from the encoder to the decoder. FIG. 5 illustrates an example of information transmitted from an encoder 510 to a decoder 520, where the transmitted information may correspond to parameters for BS equal 1 and boundary direction equal to vertical edges 532, parameters for BS equal 2 and boundary direction equal to vertical edges 534, parameters for BS equal 1 and boundary direction equal to horizontal edges 536, and parameters for BS equal 2 and boundary direction equal to horizontal edges 538. The parameters of thresholds and clipping boundaries can be signalled in a selected syntax level, such as the video parameter set (VPS), sequence parameter set (SPS), picture parameter set (PPS), slice header (SH), coding tree unit (CTU) or CU (Coding Unit).

A flag can be used to indicate whether the parameters of thresholds and clipping boundaries are signalled or not. If the parameters are not signalled, predefined parameters such as the parameters defined in the HEVC standard can be applied.

The flag can be signalled to indicate whether the parameters of thresholds and clipping boundaries for a particular condition are signalled or not. For example, the flag can be signalled to indicate whether the parameters of thresholds and clipping boundaries for a particular BS are signalled or not. If the parameters are not signalled, predefined parameters such as the parameters defined in the HEVC standard is applied for this BS. Similarly, the flag can be signalled to indicate whether the parameters of thresholds and clipping boundaries for a particular boundary direction such as vertical boundary or horizontal boundary are signalled or not. If the parameters are not signalled, predefined parameters such as the parameters defined in the HEVC standard can be applied in de-blocking filtering for this particular boundary direction.

The flag can be signalled to indicate whether the parameters of thresholds and clipping boundaries for a particular component such as the luma component or the chroma component are signalled or not. If the parameters are not signalled, predefined parameters such as the parameters defined in the HEVC standard is applied in de-blocking filtering for this particular component. In another example, the flag is signalled to indicate whether the parameters of thresholds and clipping boundaries such as TcC for one or more particular component such as U, V or UV component are signalled or not. If the parameters are not signalled, predefined parameters such as the parameters defined in the HEVC standard is applied in de-blocking filtering for this particular component or components.

In yet another embodiment, the parameters of thresholds and clipping boundaries, such as Beta0, Beta1 and Beta2, TcS, Tc0, Tc1, and TcC are different for vertical and horizontal de-blocking filtering. The parameters of thresholds and clipping boundaries can also be different for different boundary strengths. Also, the parameters of thresholds and clipping boundaries can be different for different QPs (quantization parameters).

The parameters of thresholds and clipping boundaries can be signalled by any known coding method, such as fixed length coding or VLC (variable length coding) coding defined in the HEVC standard.

The parameters of thresholds and clipping can be signalled in a predictive fashion by using prediction. For example, the parameters for horizontal de-blocking filtering can be predicted by the parameters for vertical de-blocking filtering. Similarly, the parameters for vertical de-blocking filtering can be predicted by the parameters for horizontal de-blocking filtering. In yet another example, the parameters for BS equal to X can be predicted by the parameters for BS equal to Y, where X and Y belong to {0, 1, 2} and X is larger or smaller than Y.

The parameters of thresholds and clipping can also be predicted by some predefined values. For example, the parameters can be predicted by the predefined values used in the HEVC standard. Alternatively, the parameters of thresholds and clipping can be predicted by the corresponding parameters for a previous picture.

The parameters of thresholds and clipping boundaries such as Beta0, Beta1 and Beta2, and TcS, Tc0, Tc1, and TcC can also be predicted in a one by one fashion. For example, Beta2 can be predicted by Beta1, and Beta1 can be predicted by Beta0. In another example, TcS is predicted by Tc0, and Tc0 is predicted by Tc1. In another example, TcC is predicted by TcC.

The parameters of thresholds and clipping boundaries such as TcC can be different for component U and V, denoted as TcCU and TcCV respectively. Furthermore, TcCV can be predicted by TcCU when signalled from the encoder to the decoder.

Similarly, TcCU can be predicted by TcCV when signalled from the encoder to the decoder.

Figure 6:
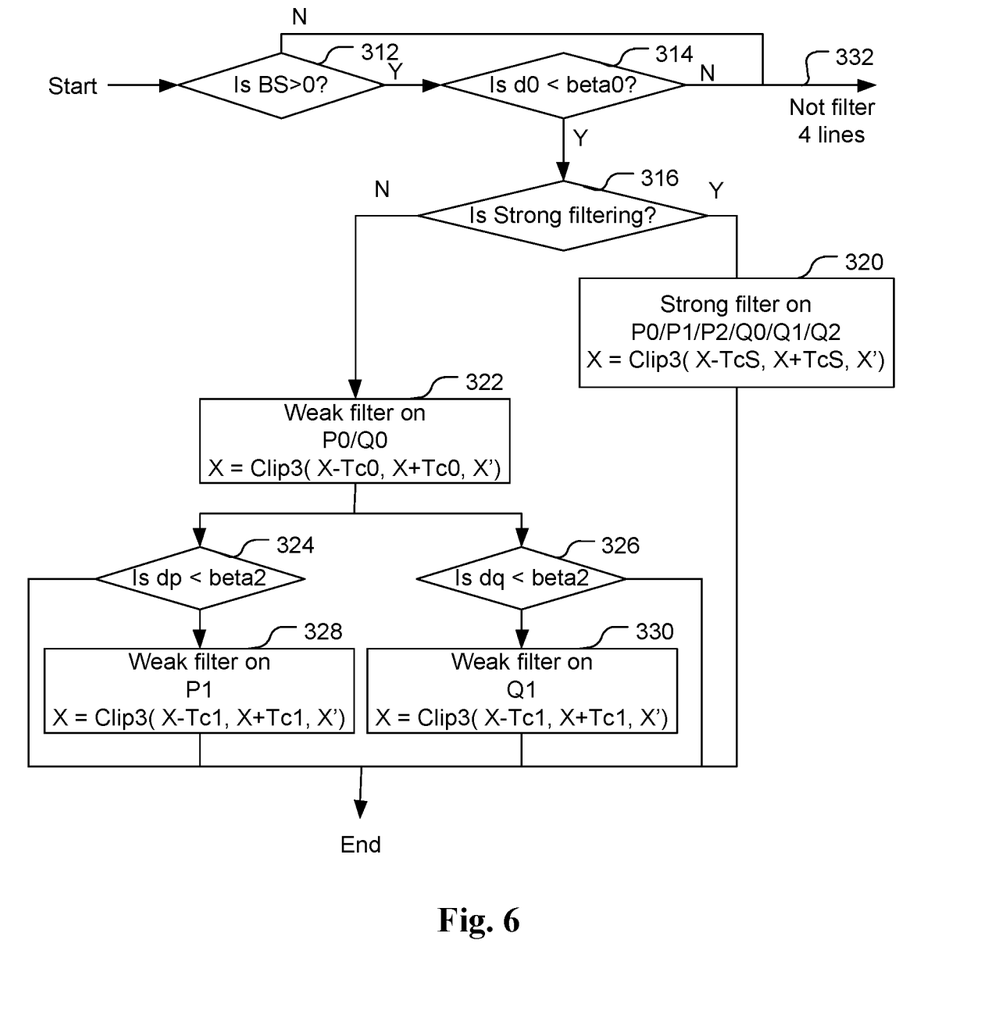
FIG. 6 illustrates an exemplary flowchart of simplified de-blocking filtering a single line for the luma component by removing one test step corresponding to "d1<beta1".

One aspect of the present invention discloses modified de-blocking decision in order to simplify the processing, to improve the performance or both. In one embodiment, the test condition of d1<beta1 can be removed. An exemplary flowchart of de-blocking filtering for this embodiment is illustrated in FIG. 6, where the flow chart is substantially the same as that in FIG. 3 except that the test "d1<beta1" (318) is omitted in FIG. 6.

Figure 7:
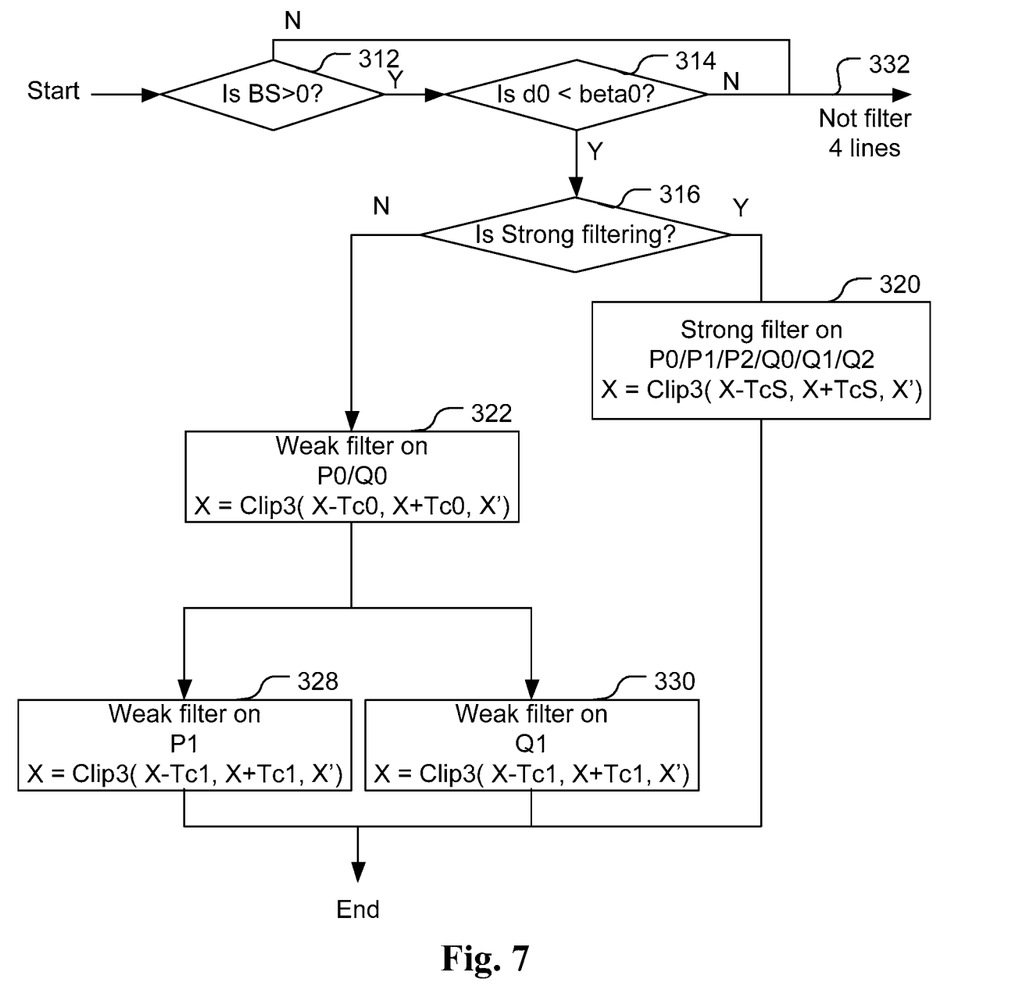
FIG. 7 illustrates an exemplary flowchart of further simplified de-blocking filtering a single line for the luma component by removing additional test steps corresponding to "dp<beta2" and "dp<beta2".

In one embodiment, the test conditions of d1<beta1, dp<beta2 and dq<beta2 can be removed. An exemplary flowchart of de-blocking filtering for this embodiment is illustrated in FIG. 7, where the flow chart is substantially the same as that in FIG. 6 except that the test "dp<beta2" (324) and "dq<beta2" (326) are also omitted in FIG. 7.

Please note that the boundary activity measures of neighbouring samples across a selected boundary (e.g., d1, dp and dq) as described in the foregoing embodiments are for illustration purpose only and the present application is not limited thereto. That is, the disclosed method can also be applied if other boundary activity measures are used.

Another aspect of the present invention discloses derivation of the parameters. In particular, the parameters used in de-blocking filtering are obtained by a training process at encoder. In the training process, a table based algorithm is applied to get trained parameters, where the table is used to store target value related to the derivation of the parameters. For example, the values (named target values in this disclosure) may correspond to distortion between original data and processed data. The algorithm can also be regarded as histogram based.

The problem statement regarding how to find an optimal threshold is described as below:

For each testing condition, a d (e.g. d0 in HEVC) is calculated.

If d<T, the line is filtered. Otherwise it is not filtered.

How to find the optimal T (i.e., the threshold) that can minimize the total distortion after de-blocking filtering?

The algorithm to solve the above problem according to the present invention is described below:

Build a table S with all entries initialized as 0.

For each test condition, d is calculated

Get distortions D0 and D1 for this boundary in the non-filtering and filtering case respectively.

S[k]+=D0 for all k<=d. S[k]+=D1 for all k>d.

After processing de-blocking filtering for all boundaries in training, find the minimal S[p], where this p is the optimal T.

Figure 8:
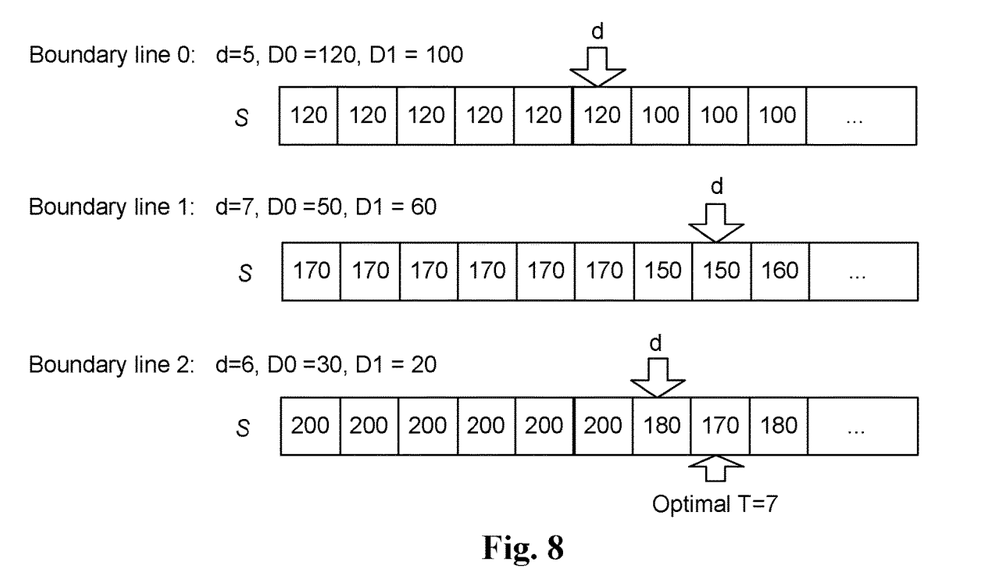
FIG. 8 illustrates an example of deriving an optimal threshold T based on a training process using a table.

According to the above process, the table S[d] is used to store the distortion for all candidate threshold values d. The candidate threshold p that has the minimal distortion is selected as the optimal threshold. FIG. 8 illustrates an example of finding the optimal T In this simplified example, there are a total of 3 boundary lines to be filtered. As shown in FIG. 8, the S table for 3 boundary lines are created by training. For line0, d=5, so the values in the table from index 0 to index 5 are filled with D0=120, the values from index 6 and beyond are filled with D1=100. For line1, d=7, so the values from index 0 to index 7 are added by D0=50, and others are added by D1=60. For line2, d=6, so the values from index 0 to index 6 are further added by D0=30, and others are further added by D1=20. After the training process, S(7) has the minimal value (i.e., 100+50+20=170). Therefore, the value of 7 is chosen as the optimal T.

The problem statement regarding how to find an optimal clipping boundary is described as below:

For a sample with value X (original sample value is X0), the sample value after de-blocking filtering without clipping is calculated as x'.

The output filtered value is Clip3(X−Tc, X+Tc, X')

How to find the optimal Tc that can minimize the total distortion after de-blocking filtering?

The algorithm to solve the above problem according to the present invention is described below:

Build a table S with all entries initialized as 0.

For each sample, calculate d=|X−X'|

S[k]+=(X'−X0)$^2$ for all k>=d

S[k]+=(X+k−X0)$^2$ for all k<d if X<=X'; S[k]+=(X−k−X0)$^2$ for all k<d if X>X'

After processing all samples, find the minimal S[p], where this p is the optimal Tc.

Figure 9:
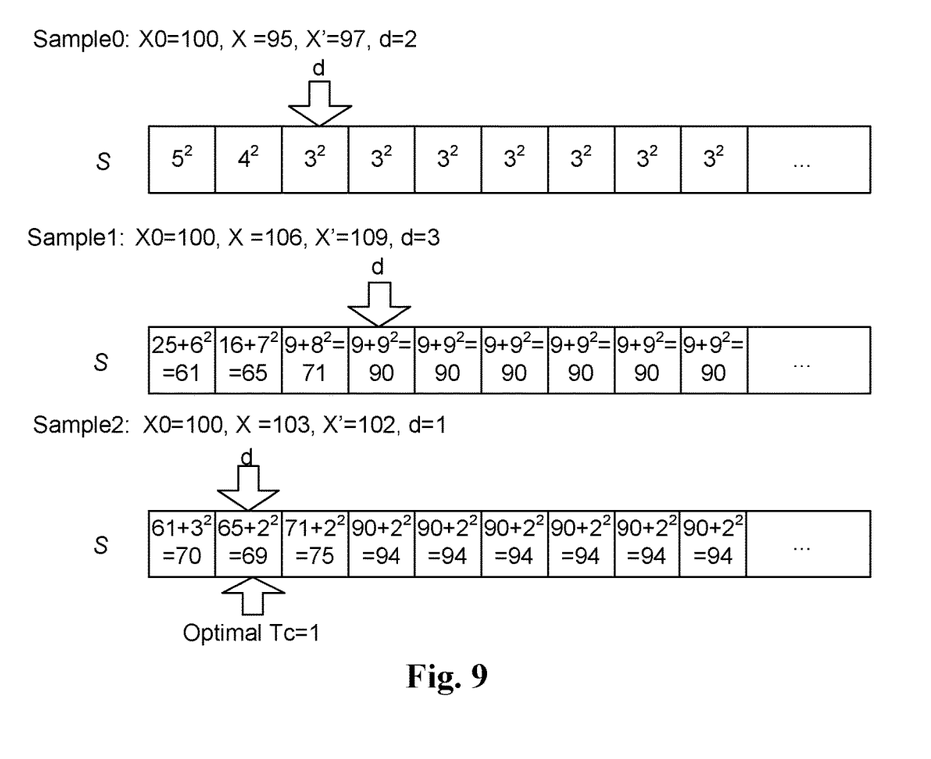
FIG. 9 illustrates an example of deriving an optimal clipping boundary value Tc based on a training process using a table.

FIG. 9 demonstrates an example of finding the optimal Tc. In this simplified example, there are a total of 3 samples to be filtered. As shown in FIG. 9, the S table for 3 samples are created by training. After the training process, S(1) has the minimal value (i.e., 4$^2$+7$^2$+2$^2$=69). Therefore, the value of 1 is chosen as the optimal Tc.

There are several parameters affecting each other in the de-blocking process. Therefore, an iterative strategy can be applied in the training process as follows:

Step 1: Initialization: Get the trained parameters with the original parameters (such as the parameters predefined in HEVC) in the filtering process at first.

Step 2: Training cycle: Get the new trained parameters with the old parameters (which are the trained parameters in the last training cycle) in the filtering process.

Step 3: Termination: Repeat step 2 until the picture Rate-Distortion (RD) cost or total distortion cannot be decreased.

The parameters used in de-blocking filtering can be obtained by using a training process on the current coded picture. However, it may cause processing delay due to waiting for the results of the training process based on the current coded picture. Accordingly, in another embodiment, the parameters used in de-blocking filtering are obtained by a training process on a previous coded picture. For example, the parameters for de-blocking filtering signalled in Frame K can be obtained by a training process on Frame K−1.

In one embodiment, the parameters used in de-blocking filtering can be obtained by a training process at decoder. In this way, the parameters are not signalled from the encoder to the decoder. However, in this case, the parameters have to be derived in the same way at both the encoder and decoder.

Figure 10:
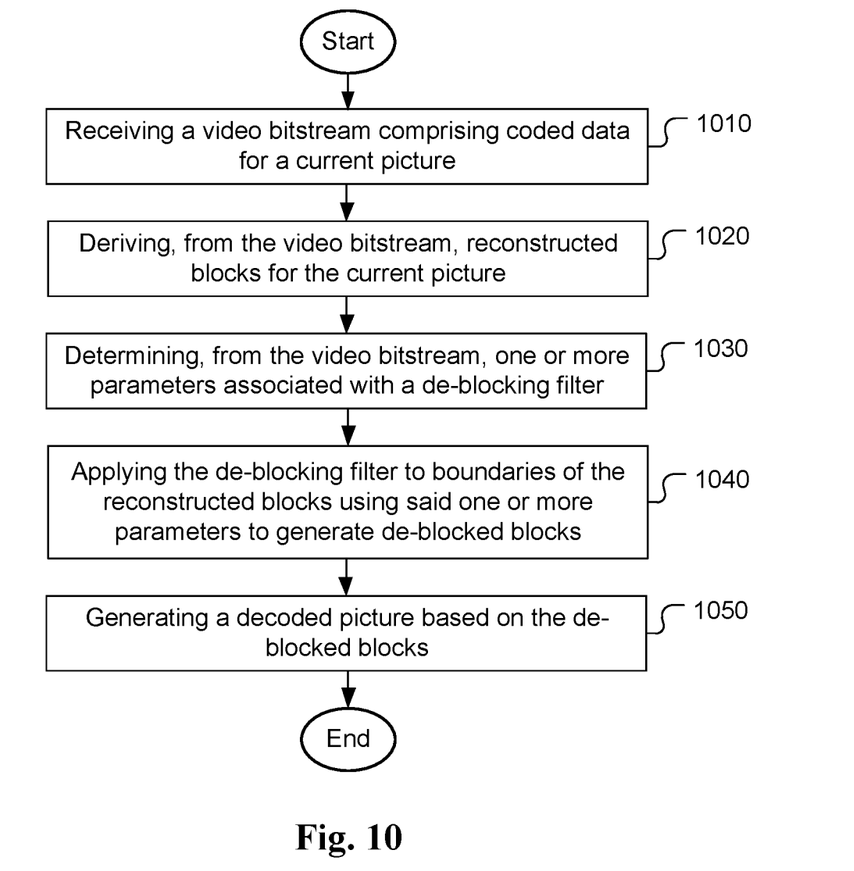
FIG. 10 illustrates a flowchart of an exemplary video decoder using adaptive de-blocking filter according to an embodiment of the present invention.

FIG. 10 illustrates a flowchart of an exemplary video decoder using adaptive de-blocking filter according to an embodiment of the present invention. According to this method, a video bitstream comprising coded data for a current picture is received in step 1010. Reconstructed blocks for the current picture are deriving from the video bitstream in step 1020. One or more parameters associated with a de-blocking filter are determined from the video bitstream in step 1030. The de-blocking filter is applied to boundaries of the reconstructed blocks using said one or more parameters to generate de-blocked blocks in step 1040. A decoded picture is generating based on the de-blocked blocks in step 1050. As known in the field, additional in-loop processing such as SAO (sample adaptive offset) may be applied after de-blocking filter to generate the final decoded picture. This decoded picture may be used as output picture or stored in the reference picture buffer.

Figure 11:
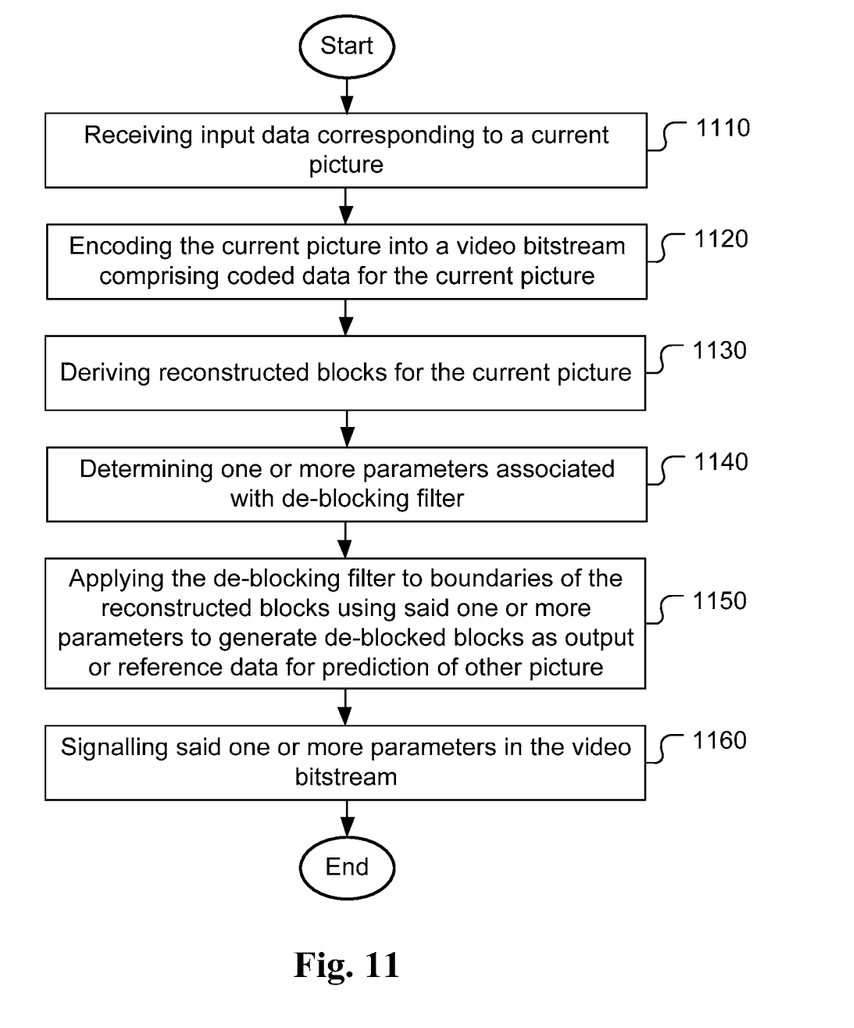
FIG. 11 illustrates a flowchart of an exemplary video encoder using adaptive de-blocking filter according to an embodiment of the present invention.

FIG. 11 illustrates a flowchart of an exemplary video encoder using adaptive de-blocking filter according to an embodiment of the present invention. According to this method, input data corresponding to a current picture is received in step 1110. The current picture is encoded into a video bitstream comprising coded data for the current picture in step 1120. Reconstructed blocks for the current picture are derived in step 1130. One or more parameters associated with de-blocking filter are determined in step 1140. The de-blocking filter is applied to boundaries of the reconstructed blocks using said one or more parameters to generate de-blocked blocks as output or reference data for prediction of other picture in step 1150. Said one or more parameters are signalled in the video bitstream in step 1160.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of de-blocking filtering of reconstructed picture in a video decoder, the method comprising:
   receiving a video bitstream comprising coded data for a current picture;
   deriving, from the video bitstream, reconstructed blocks for the current picture;
   determining, from the video bitstream, one or more first parameter sets associated with a de-blocking filter corresponding to a luma component;
   determining, from the video bitstream, one or more second parameter sets associated with a de-blocking filter corresponding to one or more chroma components;
   applying the de-blocking filters to boundaries of the reconstructed blocks using said one or more first and second parameter sets to generate de-blocked blocks, wherein the one or more first parameter sets comprises parameters of thresholds and clipping boundaries that are signalled for the luma component, wherein the one or more second parameter sets comprises parameters of thresholds and clipping boundaries that are signalled for the one or more chroma components, wherein for a given bitstream location from which the parameters are determined, the one or more first parameters sets are signalled separately and independently from the one or more second parameters sets; and
   generating a decoded picture based on the de-blocked blocks.

2. The method of claim 1, wherein each set of said one or more parameters is used for each picture, slice, coding tree unit (CTU) or CU (coding unit).

3. The method of claim 1, wherein said one or more parameters are derived from VPS (video parameter set), SPS (sequence parameter set), PPS (picture parameter set), slice header, CTU (coding tree unit) or CU (coding unit) of the video bitstream.

4. The method of claim 1, wherein said one or more parameters correspond to one or more values used as thresholds, clipping boundaries, or both the thresholds and clipping boundaries for the de-blocking filter.

5. The method of claim 1, wherein the thresholds correspond to Beta0, Beta1 and Beta2, and the clipping boundaries correspond to TcS, Tc0, Tc1, and TcC.

6. The method of claim 1, wherein said one or more first and second parameter sets are different for different boundary directions, different boundary strengths or quantization parameters, wherein the different boundary directions correspond to a vertical boundary and a horizontal boundary.

7. The method of claim 1, wherein said one or more second parameter sets comprise two different clipping boundaries TcCs for a first chroma component and a second chroma component.

8. The method of claim 7, wherein the clipping boundary TcC for one of the first chroma component and the second chroma component is predicted by the clipping boundary TcC for another of the first chroma component and the second chroma component.

9. The method of claim 1, wherein a flag is determined from the video bitstream to indicate whether said one or more second parameter sets corresponding to said one or more chroma components are signalled.

10. The method of claim 9, wherein the flag is determined from the video bitstream to indicate whether said one or more first and second parameter sets are signalled in the video bitstream for a particular boundary strength, a particular boundary direction, or a particular colour component, wherein the particular boundary direction corresponds to a vertical boundary or a horizontal boundary, and the particular colour component corresponds to a luma component or a chroma component.

11. The method of claim 1, wherein said one or more first and second parameter sets are coded using prediction.

12. The method of claim 11, wherein said one or more first and second parameter sets for a first boundary direction are predicted by said one or more first and second parameter sets for a second boundary direction, and wherein the first boundary direction and the second boundary direction are selected from a group consisting of a vertical boundary and a horizontal boundary and the first boundary direction and the second boundary direction are different boundary directions.

13. The method of claim 11, wherein said one or more first and second parameter sets for a first boundary strength are predicted by said one or more first and second parameter sets for a second boundary strength, and wherein the first boundary strength is larger than or smaller than the second boundary strength.

14. The method of claim 11, wherein said one or more first and second parameter sets are predicted by a set of pre-defined parameters.

15. The method of claim 11, wherein said one or more first and second parameter sets for a current picture are predicted by said one or more first and second parameter sets for a previous picture.

16. The method of claim 11, wherein said one or more first and second parameter sets correspond to one or more values used as thresholds, clipping boundaries, or both the thresholds and clipping boundaries for the de-blocking filter, and one threshold value is predicted by another threshold value, or one clipping boundary value is predicted by another clipping boundary value.

17. The method of claim 1, wherein said one or more first and second parameter sets comprise one or more values used as thresholds including Beta0, Beta1 and Beta2, and wherein a first test corresponding to "d1<Beta1" is skipped, and wherein d1 is related to first boundary activity measure of neighbouring samples across a selected boundary.

18. The method of claim 17, wherein a second test corresponding to "dp<Beta2" and a third test corresponding to "dq<Beta2" are skipped, and wherein dp and dq are related to second boundary activity measure and third boundary activity measure of neighbouring samples across the selected boundary.

19. An apparatus for de-blocking filtering of reconstructed picture in a video decoder, the apparatus comprising one or more electronics or processors arranged to:

receive a video bitstream comprising coded data for a current picture;
derive, from the video bitstream, reconstructed blocks for the current picture;
determine, from the video bitstream, one or more first parameter sets associated with a de-blocking filter corresponding to a luma component;
determine, from the video bitstream, one or more second parameter sets associated with a de-blocking filter corresponding to and one or more chroma components;
apply the de-blocking filters to boundaries of the reconstructed blocks using said one or more first and second parameter sets to generate de-blocked blocks, wherein the one or more first parameter sets comprises parameters of thresholds and clipping boundaries that are signalled for the luma component, wherein the one or more second parameter sets comprises parameters of thresholds and clipping boundaries that are signalled for the one or more chroma components, wherein for a given bitstream location from which the parameters are determined, the one or more first parameters sets are signalled separately and independently from the one or more second parameters sets; and
generate a decoded picture based on the de-blocked blocks.

20. A method of de-blocking filtering of reconstructed picture in a video coding system, the method comprising:
receiving input data corresponding to a current picture;
encoding the current picture into a video bitstream comprising coded data for the current picture;
deriving reconstructed blocks for the current picture;
determining one or more first parameter sets associated with a de-blocking filter corresponding to a luma component;
determining one or more second parameter sets associated with a de-blocking filter corresponding to one or more chroma components;
applying the de-blocking filters to boundaries of the reconstructed blocks using said one or more first and second parameter sets to generate de-blocked blocks as output or reference data for prediction of other picture, wherein the one or more first parameter sets comprises parameters of thresholds and clipping boundaries that are signalled for the luma component, wherein the one or more second parameter sets comprises parameters of thresholds and clipping boundaries that are signalled for the one or more chroma components, wherein for a given bitstream location from which the parameters are determined, the one or more first parameters sets are signalled separately and independently from the one or more second parameter sets; and
signalling said one or more parameters in the video bitstream.

* * * * *